H. L. INGERSOLL.
CONTROL OF BOOSTER MOTORS FOR LOCOMOTIVES.
APPLICATION FILED OCT. 20, 1919.

1,388,647.

Patented Aug. 23, 1921.

Inventor
Howard L. Ingersoll

UNITED STATES PATENT OFFICE.

HOWARD L. INGERSOLL, OF WHITE PLAINS, NEW YORK.

CONTROL OF BOOSTER-MOTORS FOR LOCOMOTIVES.

1,388,647. Specification of Letters Patent. Patented Aug. 23, 1921.

Application filed October 20, 1919. Serial No. 331,876.

*To all whom it may concern:*

Be it known that I, HOWARD L. INGERSOLL, a citizen of the United States, residing at White Plains, county of Westchester, New York, have invented a certain new and useful Improvement in Control of Booster-Motors for Locomotives, of which the following is a full, clear, and exact description, such as will enable others skilled in the art to which it appertains to make and use the same, reference being had to the accompanying drawings, forming part of this specification, in which—

This invention relates to an auxiliary or "booster" motor for a railway locomotive, the function of which is to aid the main driving means of the locomotive in starting the locomotive and propelling the same at low speeds. A booster motor, together with its controlling mechanism, is described and claimed in my application filed May 2, 1919, Serial No. 299,037 (patented May 22, 1919, as Patent No. 1,339,395). In the control system shown in the application just referred to the booster motor is operatively connected with the locomotive and motive power supplied thereto when the main driving mechanism is started and by means of the manipulation of the controlling devices of the main driving means, to-wit, the reverse and throttle levers. In accordance with this system the booster motor is put out of action when the reverse lever is hooked up to shorten the valve movement of the main driving means, which operation in the normal running of the locomotive takes places when a certain speed, usually about ten or twelve miles per hour, has been attained.

It frequently happens that a locomotive will move at a considerable speed with the main throttle closed, for example, on a long down grade. If the locomotive be provided with a booster motor, controlled as set forth above, it will be possible, in case of drifting at high speed, or when the main throttle has been opened after the locomotive has been drifting, for the engine man, either maliciously or accidentally, to move the reverse lever to such position as to bring about the engagement of the booster with the locomotive axle. If the speed of the locomotive is high enough damage to the booster and its driving connections may result. It is the primary object of the present invention to provide an improvement upon a locomotive booster controlling system, such as that described in the application above referred to, whereby the controlling system of the booster is incapacitated whenever the locomotive is drifting at high speed or when the throttle has been opened after a period of drifting with closed throttle so that the booster cannot be entrained with the locomotive under these conditions.

In the drawings, 1 indicates the shell of a locomotive boiler and 2 the steam dome thereof; 3 is the dry steam pipe leading from the steam dome down to the main cylinders 4 of the locomotive. I have conventionally shown the throttle valve 81 which controls the upper end of this dry steam pipe 3, said valve being operated by a rod 82 connected to a throttle lever 83 located in the cab of the locomotive, which lever is operable by the engineer at will.

5 are the main driving wheels of the locomotive; 6, the pilot truck wheels, and 7 the trailer truck wheels, the latter being mounted in journal boxes guided by pedestal jaws in the side frame pieces of a trailer truck frame 8.

Figure 5:
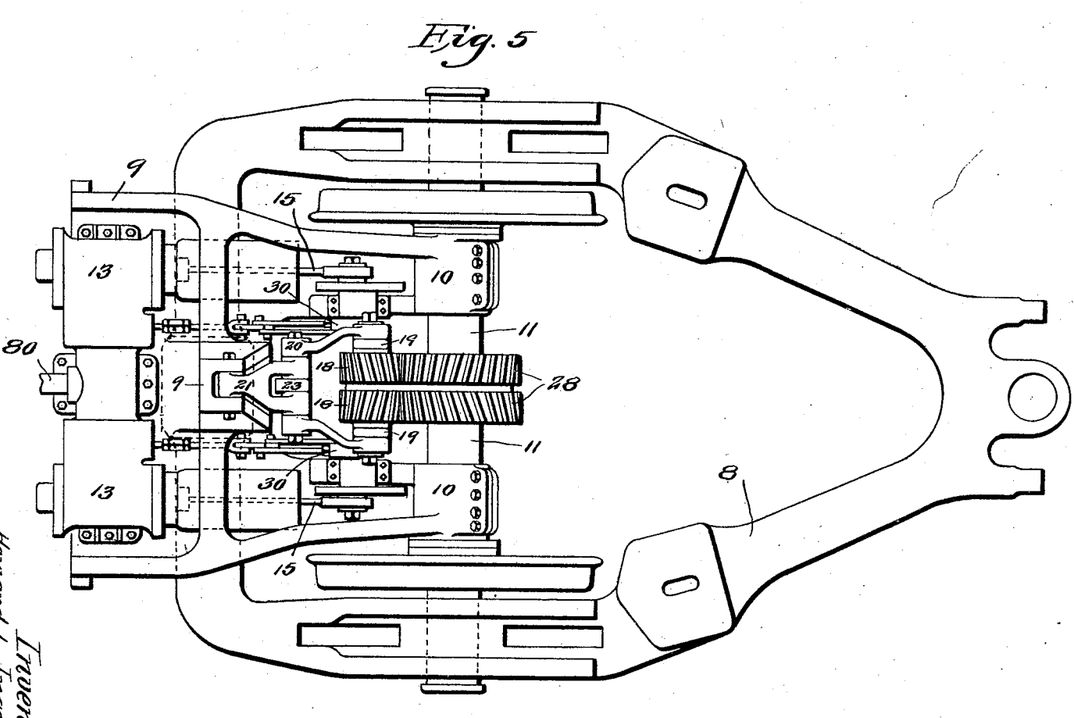
Fig. 5 is a plan view of the booster motor as applied to the trailer truck of a locomotive showing the booster entrained with the locomotive axle which it is designed to drive.

9 indicates a bed-plate for the booster motor, preferably in the form of a casting, whose forward end is provided with bearings 10, spread apart as shown in Fig. 5, to embrace the axle 11 on which the trailer truck wheels are mounted.

The booster motor *per se* preferably consists of a pair of cylinders 13 in which are arranged pistons connected to cross-heads and operating pitmen 15 which are connected to a crank shaft mounted in bearings on the bed-plate, as disclosed in my companion applications. This crank shaft 16 carries twin skew gears 17 in mesh with corresponding gears 18, the latter being mounted on rock arms 19 pivotally arranged on the crank shaft 16.

20 and 21 are the members of a toggle mechanism connected to the upper ends of the arms 19 and to the bed-plate; pintle bolt 22 forms a hinge connection between the links of the toggle, while an eye 23 pivotally connected to said pintle bolt, is attached to a piston rod 24, having a piston 25 arranged at its lower end operating in a cylinder 26. A spring 27 arranged above the piston tends at all times to depress the piston rod and break the toggle, moving it to the position shown in dotted lines in Fig. 6, wherein the gear 18 is thrown out of mesh with the gear 28 arranged on the trailer truck axle 11. A pipe leading from a source of air pressure supply, to be hereinafter described, admits pressure under the piston 25 to raise it and move the gear 18 into mesh with the gear 28. When this pressure is exhausted, the spring 27 disentrains the gears.

Figures 6, 7:
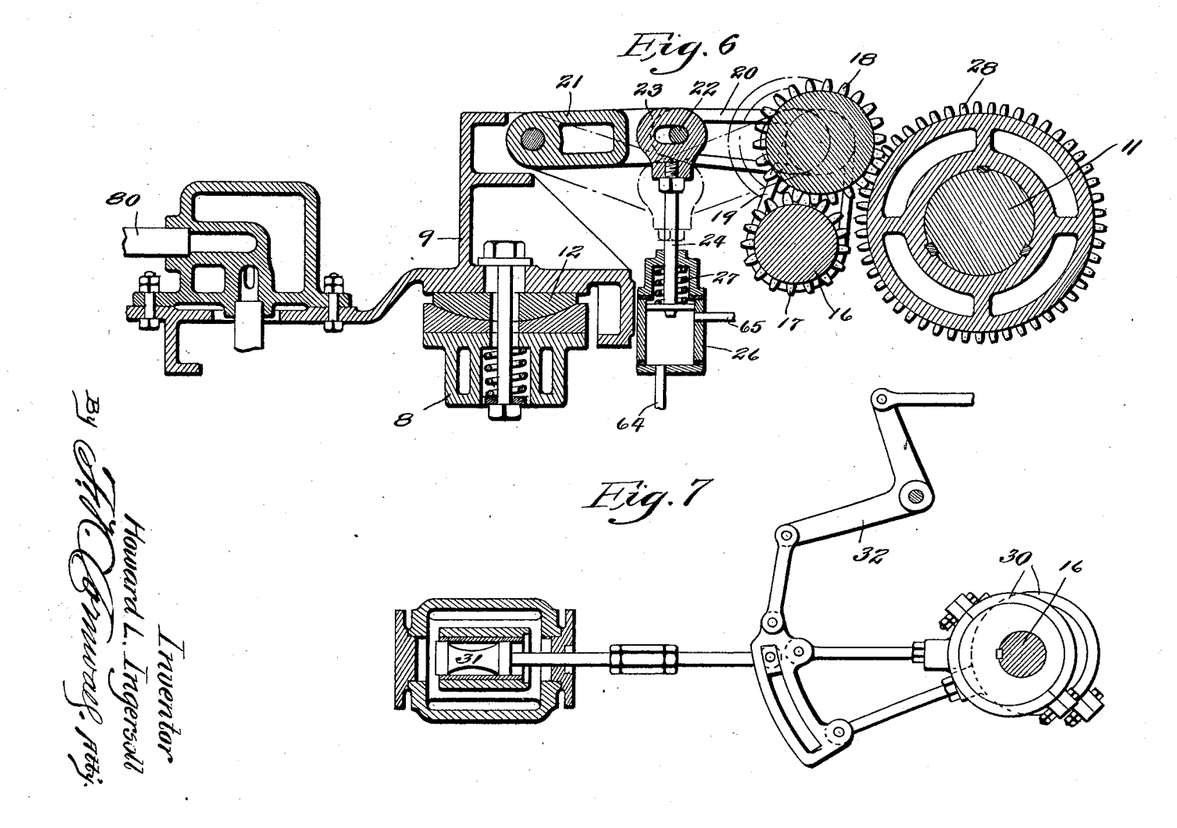
Fig. 6 is a longitudinal sectional view through the booster motor showing it entrained with the locomotive.
Fig. 7 is a diagrammatic view of the valve reversing mechanism for the booster motor.

In Fig. 7, I have shown a reversing valve mechanism for the cylinders 3, the same being in the form of eccentrics 30 mounted on the crank shaft 16 and connected by suitable links 32 to appropriately operate valves 31 arranged in the steam chest to drive the booster motor, depending upon the direction in which the main locomotive is intended to be driven.

Figure 4:
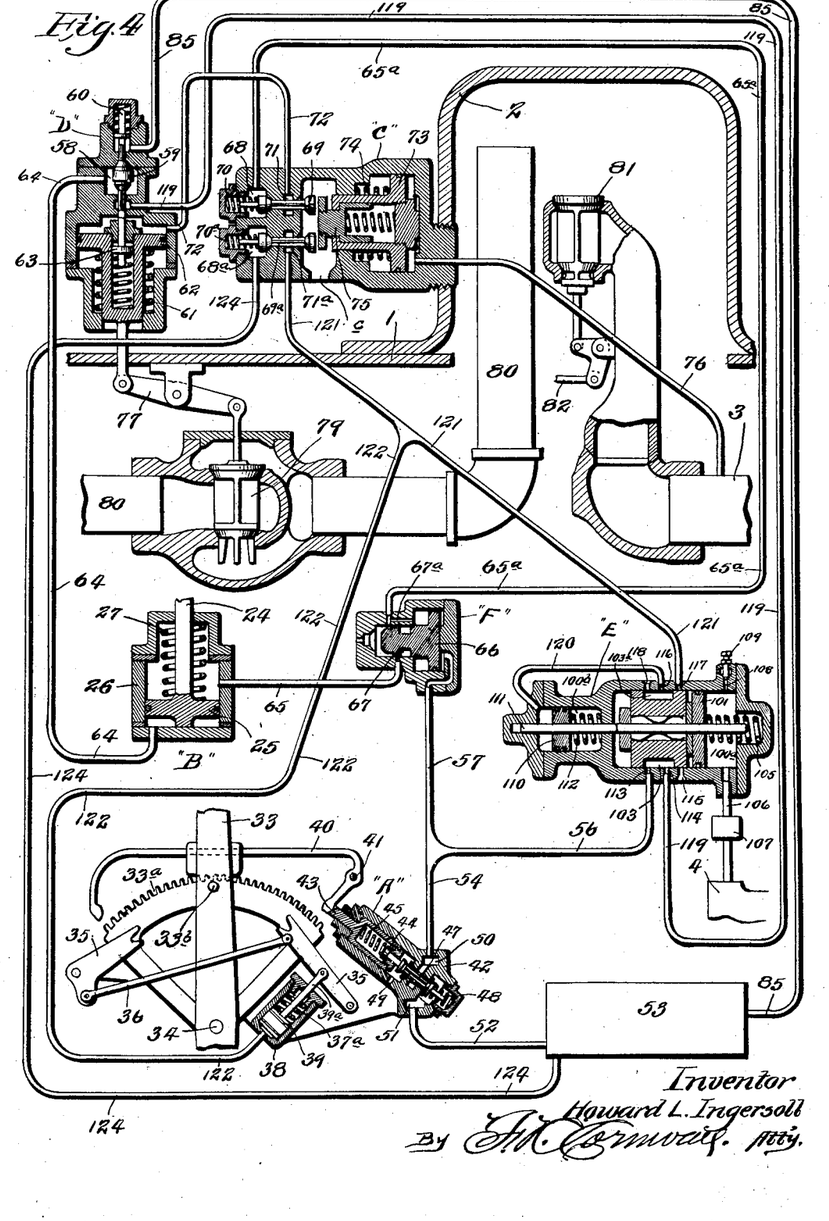
Fig. 4 is a diagrammatic view of the booster motor controlling system showing the parts in the positions they assume when the booster is out of action.

Referring now to Fig. 4, 33 indicates the reverse lever of the locomotive pivoted at 34 and having a dog (not shown) which coöperates with the teeth 33ª. This reverse lever operates in the usual way to position the valve mechanism for the main cylinders of the locomotive. When the reverse lever is thrown forward, or into the "corner" (as it is colloquially expressed), it will position the valve mechanism so that the same will be given the full stroke and the main cylinders of the locomotive receive steam throughout substantially their full stroke. This is the usual practice in starting locomotives. When the reverse lever is pulled rearwardly from its central position, the valve mechanism is so positioned that the locomotive will be driven backwardly. After the reverse lever is positioned forwardly or backwardly, as the case may be, then the throttle valve is operated to admit steam to the main cylinders through the dry steam pipe 3. In order to control the throw of the reverse lever, I provide the same with a pin or projection 33ᵇ in the path of which are arranged two oppositely disposed dogs 35. These dogs will arrest the reverse lever just one notch short of its full stroke in either direction and normally prevent its operating the booster motor controlling valve. To make the reverse lever double acting, I connect the dogs 35 by means of a rod 36 arranged on opposite sides of the pivotal points of said dogs. The dogs are normally held out of the path of pin 33ᵇ by means of expansion spring 37ª located in the upper portion of cylinder 38 and bearing on the upper end of piston 39 connected by a rod 39ª to one of the dogs. When piston 39 is moved upwardly by pressure admitted into the lower end of cylinder 38, dogs 35 will be moved upwardly in the path of pin 33ᵇ and will remain in this position as long as pressure is maintained in cylinder 38.

40 indicates an overhanging extension in the form of a lever pivoted at 41, having projections in the path of movement of the reverse lever so that when said reverse lever is moved to its extreme position in either direction, said lever 40 will be rocked to operate the booster motor controlling valve.

Thus, in the absence of pressure in the air controlling system for the booster motor, the reverse lever can be thrown to its full forward or back position in either of which it may operate valve mechanism A.

Figures 8, 9:
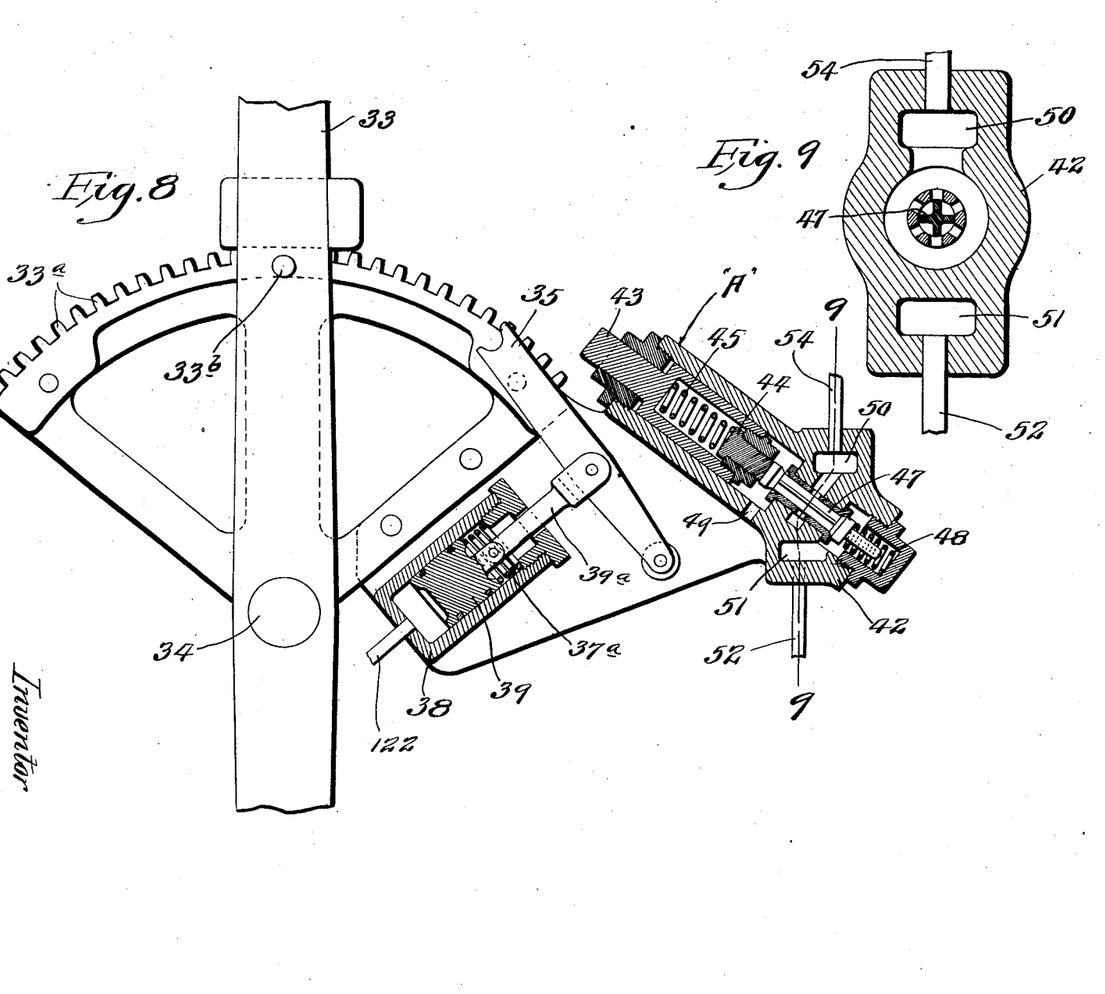
Fig. 8 is a detail view of the reverse lever and the blocking dog, air pressure mechanism for operating said dog and the valve operated by the reverse lever.
Fig. 9 is a sectional view taken on the line 9—9 of Fig. 8.

The details of construction of this booster motor controlling valve are best seen in Fig. 8, wherein the letter "A" indicates the valve in its entirety, which will be seen to consist of a casing 42 having a plunger 43 slidingly arranged therein, which plunger carries a movable head 44 in its inner end normally held in position by a spring 45 arranged within the plunger 43. 46 is a bushing forming a mount for a double headed valve 47 designed to alternately coöperate with seats at opposite ends of the bushing 46. A spring 48 tends to normally hold valve 47 in position to close the outer seat, and in this position of the valve the inner head of the valve is unseated and an exhaust port 49 thereby opened to a chamber 50. In this position of valve 47 (shown in Fig. 8) the air controlling system of the booster motor is "bled" and absence of pressure in the system causes the booster motor clutch to be disengaged and the booster motor throttle valve to be closed.

51 is the pressure chamber of the valve which is connected by means of a pipe 52 to an air-pressure reservoir 53. Thus, it may be said that pressure is constantly in the chamber 51, and that the chamber 51 is normally blocked or stopped by the outer head of the valve 47 being seated home.

When, however, the reverse lever 33 is moved to either of its extreme positions, the plunger 43 will be moved inwardly to unseat the outer head of the valve 47 and move the inner head of said valve 47 to its seat, thus establishing communication between the pressure chamber 51 and the chamber 50 and the exhaust port 49 is now closed.

We will assume for the purposes of this description that the locomotive is at a standstill and that the reverse lever has been thrown to either of its extreme positions so as to operate the valve 47 thus closing the exhaust 49 and establishing communication between the chambers 51 and 50, as above described.

54 indicates a pipe leading from chamber 50, said pipe being divided into two branches, one, 56, leading to a valve mechanism which may be generally designated as "E" and the other, 57, to a valve mechanism which may be generally designated as "F."

Figure 10:
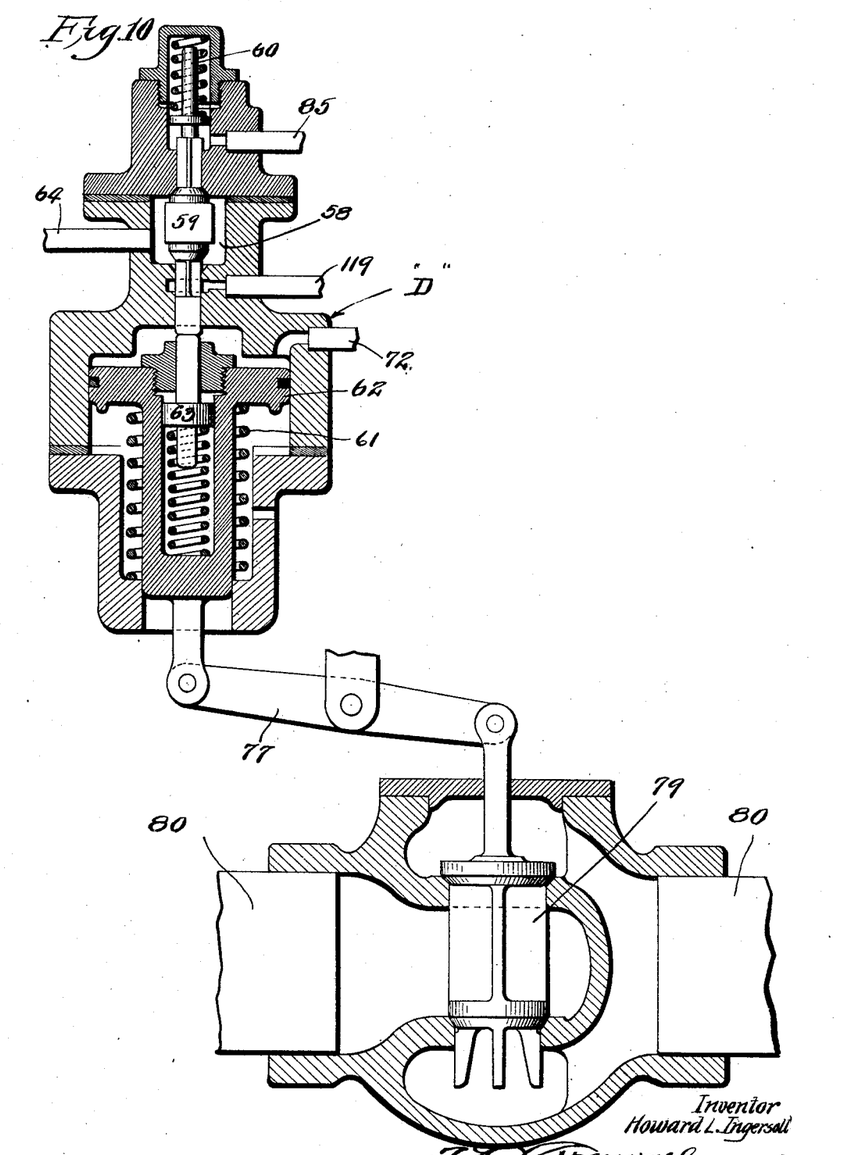
Fig. 10 is a detail view of the valve operating the throttle of the booster motor.
Figure 11:
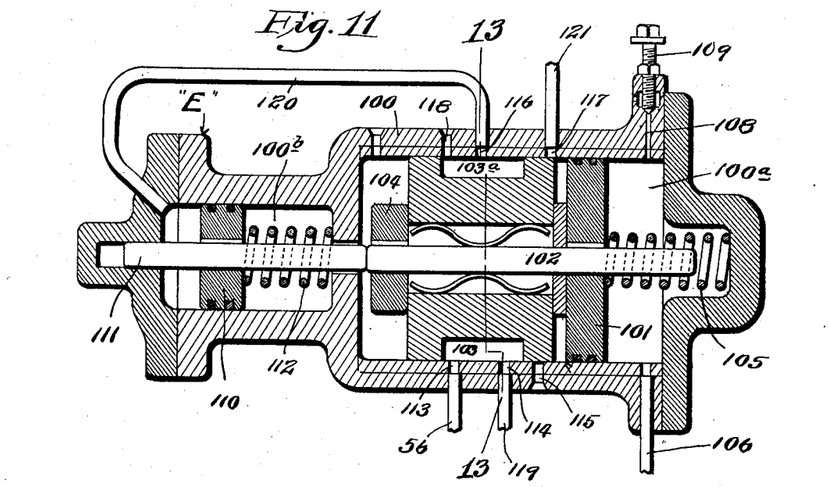
Fig. 11 is a detail view of the valve, in normal position, used in the booster motor controlling system and controlled by the vacuum in the steam chest of the cylinders of the locomotive.
Figures 12, 13:
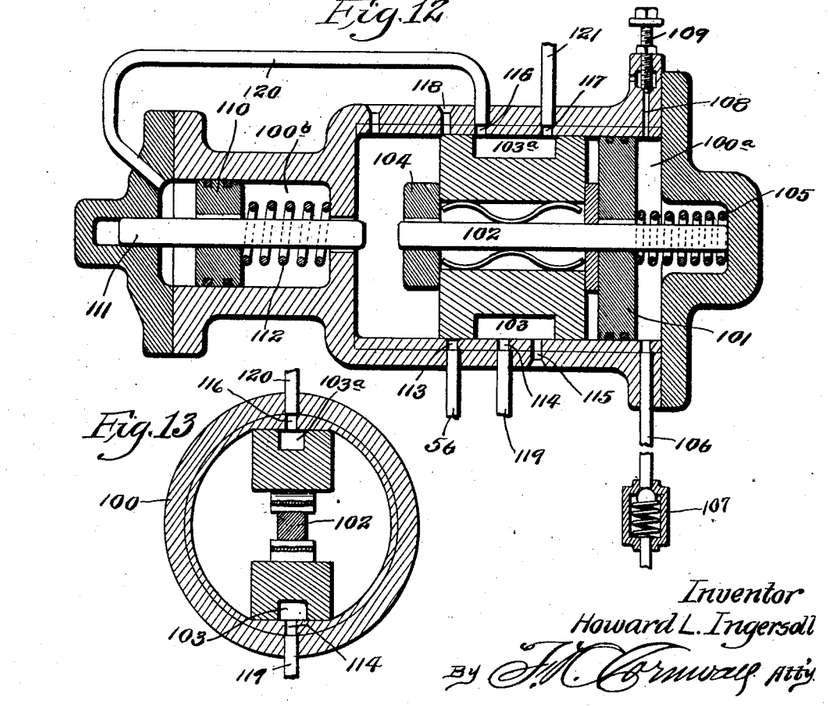
Fig. 12 is a detail view of the same valve showing said valve in moved position.
Fig. 13 is a sectional view taken on the line 13—13 of Fig. 11.

Referring to Figs. 11, 12, and 13, where valve mechanism "E" is shown in detail, 100 is a casing in which operates piston 101 to which is keyed rod 102. Carried by this rod are yielding slide valves 103 and 103ª which are held in position by piston 101 and block or collar 104. Spring 105 located in the righthand end of casing 100 bears against piston 101 and maintains it and valves 103 and 103ª in their normal position, as shown in Fig. 11. Piston 101 has packing rings to provide an air tight chamber 100ª at its right. Leading from this chamber to the steam chest of the cylinder of the locomotive is a pipe 106, in which is located a downwardly opening check valve 107. This check valve allows the air to be exhausted from chamber 100ª by the vacuum created in the main cylinders of the locomotive when the locomotive is drifting with the main throttle closed, but prevents the flow of steam or air back into the chamber 100ª through pipe 106. A port 108 leads from chamber 100ª to the atmosphere, permitting leakage whereby in the absence of a partial vacuum in said chamber, as when there is pressure in the main cylinders of the locomotive, or rather, when no vacuum is created in the main cylinders of the locomotive air from the outside is permitted to slowly leak in (the rapidity of the leakage may be regulated) and spring 105 will exert its pressure to restore the parts to the position shown in Fig. 11. Located in the opposite end of cylinder 100 is a smaller chamber 100ᵇ in which operates a piston 110 and a rod 111. One end of this rod projects into the large chamber in line with the lefthand end of the rod 102. A spring 112 maintains piston 110 in its normal or lefthand position. Ports 113 and 114 and vent 115 in cylinder 100 are designed to coöperate with valve 103. Ports 116 and 117 and vent 118 are designed to coöperate with valve 103ª. Pipe 56 leads from pipe 54 to port 113 and establishes communication between chamber 50 of valve mechanism "A" and valve 103. Pipe 119 leads from port 114 to the booster motor throttle valve mechanism "D" (see Figs. 4 and 10) and establishes communication between chamber 58 in valve mechanism "D" and valve 103. Pipe 120 leads from port 116 to the lefthand end of chamber 100ᵇ and in front of piston 110. Pipe 121 leads from port 117 to chamber 71ª of valve mechanism "C". Pipe 122 connected to pipe 121 establishes connection between pipe 121 and the chamber under piston 39.

Referring now to Fig. 10, which illustrates the details of valve mechanism "D," it will be observed that there is a valve chamber 58 containing two connected valves 59 having oppositely extending cruciform stems and designed to be seated, respectively, in the seats in opposite sides of the chamber 58. There is a spring pressed plunger 60 arranged in the upper portion of the valve casing which tends to unseat the upper valve and seat the lower valve. This spring-pressed plunger is opposed by a stronger spring 61 bearing against the underside of a piston 62 having a spring-pressed plunger 63 which engages with the lower solid end of the rod or stem carrying the double valve 59 and normally holds the lower one of said valves from its seat so that communication is normally established between pipe 119ª and chamber 58. The purpose of providing a spring-pressed plunger 63 is to enable the piston 62 to have a slightly greater stroke than the movement of the double valve 59 so that the upper one of the valves will be held yieldingly to its seat.

Figure 1:
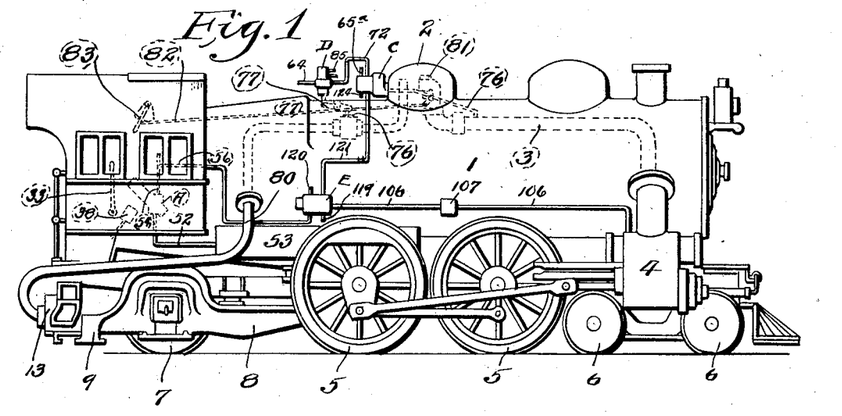
Figure 1 is a conventional illustration of a locomotive equipped with my improved booster motor.
Figure 2:
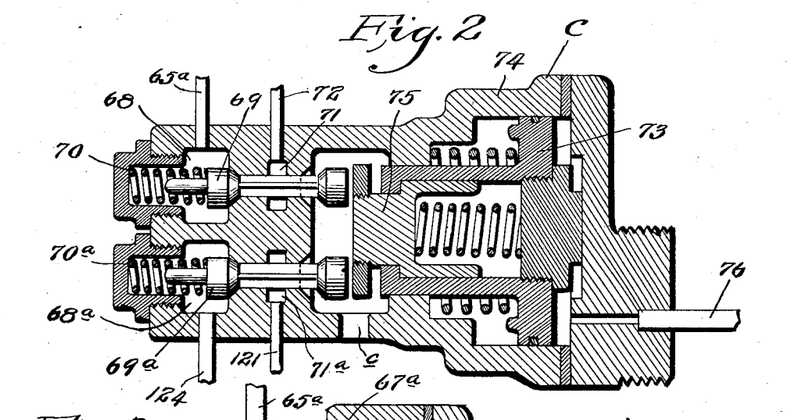
Fig. 2 is a detail view of one of the valves used in the booster motor control system.
Figure 3:
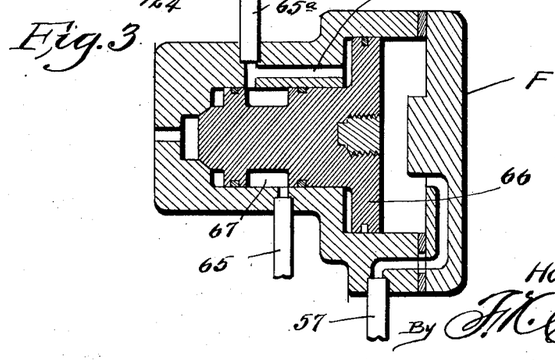
Fig. 3 is a detail view of another one of the valves used in said system.

Leading from the chamber 58 is a pipe 64 which admits pressure to the underside of the clutch operating piston 25 of valve mechanism "B" to raise it and move the gear 18 into mesh with the gear 28. When this pressure is released, the spring 27 disentrains the gears, as before described. After the gears are entrained by the upward movement of piston 25, a port in the upper portion of cylinder 26 communicating with pipe 65, is opened when piston 25 is raised, so that pressure is permitted to pass through pipe 65 to the valve mechanism generally designated as "F". When pressure is initially admitted to pipe 54 before described, it passes into the two branches 56 and 57 referred to, the controlling effect of pressure in the pipe 56 having just been described. The pressure in pipe 57 causes valve 66 to move leftwardly (see Figs. 3 and 4) thereby establishing communication between pipes 65 and 65$^a$ by means of port 67 in valve 66. There is a branch port 67$^a$ leading to the inner end of the chamber in which the head of valve 66 operates, but due to the preponderating pressure on the outer face of the head of the valve, said valve will be moved toward the left, as shown in Fig. 3, to establish communication between pipe 65 and the valve port 67, as above described. In this leftward position of the valve pressure from the port 67 passes through pipe 65$^a$ into chamber 68 in valve mechanism "C", in which chamber is located one head of a double headed valve 69 (see Figs. 2 and 4). This double headed valve has its outer head normally held to its seat by means of a spring 70, hence no pressure in chamber 68 can pass beyond the valve while the same is thus seated.

71 indicates a chamber in the valve casing of valve mechanism "C" from which leads a pipe 72 to the upper end of the chamber containing the throttle operating piston 62, and which chamber, through the pipe 72, is normally exhausted and has communication between chamber 71 and the atmosphere through exhaust port $c$.

Chamber 68$^a$ in valve mechanism "C" is connected to air reservoir 53 by a pipe 124. This chamber is normally closed by double headed valve 69$^a$ held to its seat by means of a spring 70$^a$, hence no pressure can pass from chamber 68$^a$ to chamber 71$^a$, the latter being connected to cylinder 38 containing the reverse lever dog-disabling piston 39, and valve 103$^a$.

73 is a piston in valve mechanism "C" normally held retracted (to the right) by means of a spring 74, said piston carrying a spring-pressed plunger 75 in line with the inner heads of valves 69 and 69$^a$.

In the usual starting operation of locomotives, reverse lever 33 is first operated to move the valve mechanism for the main cylinders in a direction appropriate to drive the engine forwardly or backwardly, as desired, and when this is done (the disabling dogs 35 being depressed out of the path of movement of pin 33$^b$) the reverse lever will operate the plunger in valve mechanism "A" and admit air pressure into the booster motor air pressure controlling system. This air pressure through pipes 54 and 57 will be admitted to valve mechanism "F" and move piston 66 leftwardly, thereby establishing communication between pipes 65 and 65$^a$ by means of port 67 (see Fig. 3). The air pressure also passes through pipes 54 and 56 to valve 103 in valve mechanism "E" and thence through pipe 119 into chamber 58 in valve mechanism "D", whence it passes through pipe 64 to the lower end of the chamber in cylinder 26 and underneath the clutch operating piston 25, moving it upwardly and entraining the booster motor with the axle to be driven. When piston 25 moves upwardly, it opens communication between the pressure in cylinder 26 through pipe 65, port 67 (in valve mechanism F), and pipe 65$^a$ to chamber 68 in valve mechanism C, which remains closed until the engineer opens the main throttle valve when steam, entering dry steam pipe 3, passes through pipe 76 behind piston 73, moving it leftwardly and operating valve 69 and 69$^a$, thereby opening communication between pressure chambers 68 and 71 and 68$^a$—71$^a$, respectively. Chamber 71 is connected by means of pipe 72 to the booster motor throttle valve mechanism "D" and this pressure is utilized to move piston 62 downwardly, thereby opening the booster throttle valve 79 in the booster supply pipe 80. The downward movement of piston 62 causes valve 59 to drop to its lower seat and close communication between pipe 119 and chamber 58, but at the same time, this movement of valve 59 opens communication between pipe 85 and chamber 58, thus admitting air pressure directly from the air reservoir 53 through pipe 85 and chamber 58 and pipe 64 to cylinder 26, as long as pressure from chamber 68 holds piston 62 in its downward position. When valve 69 is permitted to move to its normal position, as by the absence of pressure in the dry steam pipe 3, pressure above piston 62 will be exhausted through chamber 71 to the atmosphere (through exhaust port $c$), and spring 61 will move piston 62 upwardly closing the booster motor throttle valve, and also move valve 59 upwardly, closing communication between chamber 58 and pipe 85, restoring communication between chamber 58 and pipe 119. Chamber 68$^a$ is connected by means of pipe 124 to the air reservoir 53, and when valve 69$^a$ is operated (moved leftwardly) by plunger 75, the pressure from chamber 68$^a$ enters pipe 121 and port 117, where it is blocked by valve 103$^a$ as long as piston 101 is in its normal position (see Fig. 11). Pressure also enters the bottom of cylinder 38 through pipe 122 connected to pipe 121, moving piston 39 and rod 39$^a$ upwardly, setting the dogs 35. If the reverse lever is in either extreme position, the dogs 35 will not finish their upward movement, because one of them will be located under and rest against pin 33ᵇ; but when the lever is moved or "hooked up," *i. e.*, retracted a notch or two so that the main pistons of the locomotive will be operated partly by expansion, the dogs will be in a position to complete their upward movement into the path of pin 33ᵇ thereby preventing the subsequent operation of valve mechanism "A" by the reverse lever as long as there is pressure under piston 39 to hold the dogs elevated. The dogs 35 will remain in their raised or blocking position until the main throttle is closed, when piston 73 (of valve mechanism C) will move to its normal position and cylinder 38 will be exhausted by the rightward movement of valve 69ᵃ opening chamber 71ᵃ to atmosphere through exhaust port *c*.

To prevent operation of the booster motor when the locomotive is drifting, *i. e.*, running downgrade or at high speed with the main throttle closed, valve mechanism "E" is interposed between valve mechanism "A" and the mechanism controlled by it. Valve mechanism "E" is not actuated, and does not affect the air pressure system of the booster motor except when the locomotive is drifting, and a vacuum is produced in the main cylinders of the locomotive of such low pressure that the tension of spring 105 is overcome and piston 101 and valves 103 and 103ᵃ and rod 102 moved rightwardly, or to the position shown in Fig. 12. When in this position, valve 103 blocks port 113 and pipe 56, thereby shutting off air pressure from the reservoir 53, through pipes 54—56 to the system. The rightward position of valve 103 also establishes communication between clutch cylinder 26 and the atmosphere through pipe 64, chamber 58, pipe 119, and vent 115. Should the engineer open the main throttle while the locomotive is drifting with the reverse lever in the corner, and after piston 101 has been actuated by the vacuum, the steam pressure entering behind piston 73 will move valve 69ᵃ and establish communication between chambers 68ᵃ and 71ᵃ thereby admitting air pressure from air reservoir 53, through pipes 124 and 121, port 117, valve 103ᵃ, port 116, and pipe 120, into chamber 100ᵇ in front of piston 110, moving it toward piston 101 until rod 112 strikes 102. The air pressure in chamber 100ᵇ will now hold piston 101 in its position at the right as long as the main throttle is open, and will maintain the controlling mechanism of the booster motor in its disabled condition, notwithstanding that there is high pressure, and not low (so called vacuum) in the main cylinders of the locomotive and this disablement will continue until the engineer closes the main throttle and the speed of the locomotive falls below a predetermined rate. When the main throttle is closed, piston 73 will move to its normal position (at the right) and valve 69ᵃ will close chamber 68ᵃ and open chamber 71ᵃ to atmosphere (through exhaust port *c*) thereby exhausting chamber 100ᵇ through pipes 120 and 121, and permitting springs 105 and 112 to restore pistons 101 and 110 to their normal positions.

Locomotives are now usually equipped with a drifting valve. When the speed of the drifting locomotive falls below a certain rate this valve permits sufficient leakage of air into the cylinders to equalize the vacuum produced therein, so that a locomotive, running at this speed will not actuate valve mechanism "E"; and if piston 101 has been moved by a so-called vacuum produced while the locomotive has been previously running at a speed above this rate, (where the drifting valve ceases to admit sufficient air to overcome the vacuum), and then the speed of the locomotive is reduced to this predetermined rate, (where the drifting valve becomes effective), the vacuum in chamber 100ᵃ will be destroyed by the leakage of air controlled by the adjustable valve 109, so that spring 105 will move piston 101 and valves 103 and 103ᵃ to their normal positions.

Summary of operation: It will be assumed that the locomotive is at a stand still and the engine man first puts reverse lever 33 into its extreme right hand position (Fig. 4) and then opens the main throttle valve 81 to set the main driving means of the locomotive in operation. The reverse lever operates valve A to put pipe 54 in communication with pipe 52 leading from the air reservoir 53. Air passes through pipe 56 and pipe 119 into chamber 56 of the controller D and through pipe 64 of the booster entraining motor B, raising piston 25 thereof and entraining the booster motor with the axle which it is designed to drive. When piston 25 uncovers the end of pipe 65 air passes through pipe 65 and into pipe 65ᵃ, valve 66 having been moved to the left, on actuation of valve A, by pressure passing through pipe 57. The air in pipe 65ᵃ is blocked in chamber 68 by valve 69. As soon as the main throttle valve 81 is opened steam pressure passes through pipe 76 back of piston 73 of the controller C and valve 69 is moved to the left putting pipe 72 in communication with chamber 68. Air thereupon flows through pipe 72 into the controller D above piston 62 thereof, depressing the piston and opening the booster throttle valve 79. The downward movement of piston 62 allows valve 58 to be moved from its upper to its lower seat, thereby closing communication between pipe 119 and pipe 64, but this does not involve any change in the other parts of the control system since air from the reservoir 53 may now flow through pipe 85 and past valve 59 to pipe 64.

In the normal operation of the locomotive when certain speed is attained, say about ten or twelve miles per hour, the engineer hooks back his reverse lever to shorten the movements of the steam valves. In the booster control system shown this movement of the reverse lever brings about first the shutting off of steam from the booster motor and thereafter the disconnection of the motor from the locomotive axle. When the reverse lever 33 moves out of contact with valve device A communication is closed between the air reservoir 53 and pipes 54 and 57. The pressure in pipe 65 (in communication with reservoir 53 through pipe 85) moves the piston valve 66 to the right closing communication between pipe 65 and pipe $65^a$. This shuts off the air from the booster throttle valve operating motor D and the booster throttle valve 79 is closed. The downward movement of piston 62 allows valve 59 of mechanism D to be moved to its lower seat shutting off communication between pipe 85 and pipe 64. This shuts off the supply of fluid pressure to the booster entraining motor B and the disentrainment of the booster from the locomotive axle follows.

It will be observed that the main throttle valve may be closed without disentraining the booster from the locomotive providing the reverse lever is left in its extreme forward position. The closing of the main throttle merely involves the shutting off of steam from the booster motor. When the main throttle valve 81 is closed steam pressure is cut off from controller C and valve 69 moves to the right (Fig. 4). This shuts off air pressure from the booster throttle valve actuating mechanism D, so that the booster throttle valve is closed, but does not interfere with continued supply of compressed air to the entraining motor B, since, valve A being open, air may flow to motor B through pipes 52, 54, 56, 119 and 64.

It will now be assumed that the locomotive is drifting down a grade with its throttle valve closed. As soon as a certain speed is attained the vacuum produced in chamber $100^a$ of the controller E through the exhaust pump action of the locomotive cylinders will cause valves 103, $103^a$ to be moved to the right. Valve 103 blocks off pipe 56 so that if the reverse lever be in the corner and the booster motor entrained with the engine, the disentrainment of the booster at once takes place through the shutting off of the air supply to motor B between pipes 56 and 119. If the reverse lever is retracted the engine man cannot, under these conditions, cut in the booster by moving the reverse lever into the corner since controller E cuts the air line to motor B at a point beyond valve A. If the locomotive be running at a speed which will develop sufficient vacuum in chamber $100^a$ to hold valves 103, $103^a$ in their right hand positions (the speed at which E is actuated depending upon the adjustment of the needle valve 109 thereof) and the locomotive reaching the bottom of the grade, let us say, the engineer opens his main throttle valve to start up the main driving means of the locomotive, air will pass from the reservoir 53 through pipe 124 to chamber $68^a$ and past valve $69^a$, which will have been moved to the left by the opening of the main throttle, then through pipe 121 and branch pipe 122 to cylinder 38. The piston 39 in cylinder 38 is moved upwardly throwing dog 35 into the path of the stud $33^b$ on the reverse lever, assuming that the latter has been hooked up, so that, so long as the main throttle be open, the reverse lever cannot be moved to a position which will entrain the booster motor with the locomotive.

When air passes from pipe 121 into pipe 122 it also flows through the continuation of pipe 121 leading to the controller E, and, if valve $103^a$ is in its right hand position, the air from pipe 121 will enter the chamber to the left of piston 110 so that the valves 103, $103^a$ are positively held in their right hand position by air pressure for such period as the main throttle valve of the locomotive remains open. The necessity for this is that the introduction of steam to the main cylinders will necessarily involve destruction of the vacuum in chamber $100^a$, and if the air line to the entraining motor B were not kept closed between pipes 56 and 119 after the main throttle were opened, the engine man might entrain the booster motor with the locomotive, after the latter had been drifting at a relatively high speed, by first putting the reverse lever in the corner and then opening the main throttle.

I claim:

1. In a controlling mechanism for booster motors for locomotives, the combination of the driving mechanism of the locomotive, a booster motor, an air pressure system for controlling the booster motor, and means whereby said air pressure system is controlled by a so-called vacuum in the main cylinder of the locomotive.

2. In a controlling mechanism for booster motors for locomotives, the combination of the driving mechanism of the locomotive, a booster motor, an air pressure system for controlling the booster motor, means whereby said air pressure system is controlled by the driving mechanism of the locomotive, said means, controlling said air pressure system being adapted under drifting conditions of the driving mechanism of the locomotive to be actuated by it to disable said air pressure system and cut out said booster motor.

3. In a controlling mechanism for booster motors for locomotives, the combination of the driving mechanism of the locomotive, a booster motor, an air pressure system for controlling the booster motor, and means controlling said air pressure system and under control of the driving mechanism of the locomotive and normally ineffective, said means under drifting conditions of the driving mechanism of the locomotive being made effective to disable said air pressure system and cut out the booster motor.

4. In a controlling mechanism for booster motors for locomotives, the combination of the driving mechanism of the locomotive, a booster motor, an air pressure system for controlling the booster motor, and a device controlling said air pressure system and designed to be actuated by vacuum created in the driving mechanism of the locomotive.

5. In a controlling mechanism for booster motors for locomotives, the combination of the driving mechanism of the locomotive, a booster motor, an air pressure system for controlling the booster motor, and a device controlling said air pressure system and adapted to hold said booster motor in disabled condition so long as drifting conditions exist in the main driving mechanism of the locomotive.

6. In a controlling mechanism for booster motors for locomotives, the combination of the driving mechanism of the locomotive, a booster motor, an air pressure system for controlling the booster motor, and means operable under high speed conditions in the main driving mechanism of the locomotive for controlling said air pressure system.

7. In a controlling mechanism for booster motors for locomotives, the combination of the driving mechanism of the locomotive, a booster motor, an air pressure system for controlling said booster motor, said air pressure system including a fluid pressure operated piston adapted to entrain and disentrain the booster motor with the driven axle of the locomotive, and means under control of the main driving mechanism for controlling said air pressure system, and to disentrain said booster motor from its driven axle under predetermined working conditions of said driving mechanism.

8. In a controlling mechanism for booster motors for locomotives, the combination of the driving mechanism of the locomotive, a booster motor, an air pressure system for controlling the booster motor, said air pressure system including a fluid pressure operated piston, a clutch operated by said piston, to establish or disestablish a driving connection between the booster motor and an axle of the locomotive, and a device under the control of the main driving mechanism of the locomotive for exhausting pressure from said cylinder, whereby said driving connection between said booster motor and its driven axle is disestablished.

9. In a controlling mechanism for booster motors for locomotives, the combination of the driving mechanism of the locomotive, a booster motor, an air pressure system for controlling the booster motor, a device adapted to be actuated by the main driving mechanism of the locomotive for disabling said booster motor, and means for maintaining said device under certain working conditions in its booster-motor-disabling position.

10. In a controlling mechanism for booster motors for locomotives, the combination of the driving mechanism of the locomotive, a booster motor, an air pressure system for controlling the booster motor, a device adapted to be actuated by the main driving mechanism of the locomotive for disabling said booster motor, and means controlled by said device for maintaining it under certain working conditions of the locomotive in its booster-motor-disabling position.

11. In a controlling mechanism for booster motors for locomotives, the combination of the driving mechanism of the locomotive, a booster motor, an air pressure system for controlling the booster motor, a fluid operated piston actuated by reduction of pressure in the main driving mechanism of the locomotive below atmospheric pressure, and valves operated by said piston for controlling said air pressure system to cut out said booster motor.

12. In a controlling mechanism for booster motors for locomotives, the combination of the driving mechanism of the locomotive, a booster motor, an air pressure system for controlling the booster motor, a cylinder connected with the main driving mechanism of the locomotive, valves for controlling said air pressure system, a piston coöperating with said valves and adapted to be actuated by vacuum created in said cylinder, and means for restoring said piston and valves to their normal positions.

13. In a controlling mechanism for booster motors for locomotives, the combination of the driving mechanism of the locomotive, a booster motor, an air pressure system for controlling the booster motor, a cylinder connected with the main driving mechanism of the locomotive, valves for controlling said air pressure system, a piston coöperating with said valves, and adapted to be actuated by vacuum created in said cylinder under certain working conditions in the driving mechanism of the locomotive, and means for regulating the vacuum in said cylinder.

14. In the controlling mechanism for booster motors for steam operated locomotives, the combination of the controlling mechanism of the locomotive including a reverse lever and throttle valve operating device, a booster motor, an air pressure system controlling the same, a valve controlling said air pressure system and adapted to be actuated by the reverse lever, a blocking member adapted to be moved into the path of the reverse lever to prevent operation of said valve by said reverse lever, and means controlled by said throttle valve operating device for operating said blocking member.

15. In a controlling mechanism for booster motors for locomotives, the combination of controlling and driving mechanisms of the main locomotive, a booster motor, an air pressure system for controlling said booster motor, means operated by the controlling mechanism of the main locomotive whereby said booster motor is rendered effective, and means operated by the driving mechanism of the main locomotive for cutting out and rendering said booster motor ineffective.

16. In a controlling mechanism for booster motors for locomotives, the combination of controlling and driving mechanisms of the main locomotive, a booster motor, an air pressure system for controlling said booster motor, means operated by the controlling mechanism of the main locomotive whereby said booster motor is rendered effective through said air pressure system, and means in said air pressure system and operated by the driving mechanism of the locomotive whereby said booster motor is rendered ineffective.

17. In a controlling mechanism for booster motors for locomotives, the combination of the controlling and driving mechanisms of the main locomotive, a booster motor, an axle designed to be driven by said booster motor, a clutch for entraining said booster motor with said axle, an air pressure system for operating said clutch, means operated by the controlling mechanism of the main locomotive for controlling the pressure in said system whereby the booster motor is entrained with its axle, and means operated by the driving mechanism of the main locomotive for controlling the pressure in said system whereby the booster motor is disentrained from its axle.

18. In a controlling mechanism for booster motors for locomotives, the combination of the controlling and driving mechanisms of the main locomotive, a booster motor, an axle designed to be driven by said booster motor, a throttle valve for admitting steam pressure from the main locomotive to said booster motor, an air pressure system for operating said throttle, means operated by the controlling mechanism of the main locomotive for controlling pressure in said system whereby said throttle is opened and steam admitted to said booster motor, and means operated by the driving mechanism of the main locomotive for controlling the air pressure in said system whereby said throttle is closed.

19. In combination with the main driving means of a steam propelled locomotive, a booster motor to aid the main driving means in starting the locomotive and propelling it at low speed, and means whereby the booster is put out of action automatically when the locomotive is drifting and attains a given speed.

20. In combination with the main driving means of a steam propelled locomotive, a booster motor to aid the main driving means in starting the locomotive and propelling it at low speed, and controlling mechanism for the booster comprising a device actuated by creation of vacuum when the locomotive attains a given speed which disables the booster from operation at said speed or higher speed.

21. In combination with the main driving means of a steam propelled locomotive, a booster motor to aid the main driving means in starting the locomotive and propelling it at low speed, and means whereby the booster is put out of action automatically when the locomotive in drifting attains a given speed, said last named means being adjustable for actuation at different speeds of the locomotive.

22. In combination with the main driving means of a steam propelled locomotive, a booster motor having a releasable driving connection with the locomotive, and means operative when the locomotive in drifting attains a given speed for releasing said driving connection.

23. In combination with the main driving means of a steam propelled locomotive, a booster motor having a releasable driving connection with the locomotive, and means operative through creation of a vacuum by the locomotive when attaining a given speed for releasing said driving connection.

24. In combination with the main driving means of a steam propelled locomotive, a booster motor to aid the main driving means in starting the locomotive and propelling it at low speeds, and controlling means for the booster motor actuated when the main driving means is set in operation to put the booster in action and when the locomotive, in drifting, attains a given speed, to put the booster out of action.

25. In combination with the main driving means of a steam propelled locomotive, a booster motor having a releasable driving connection with the locomotive, and means actuated when the main driving means is set in operation for establishing said driving connection and when the locomotive, in drifting, attains a given speed for releasing said driving connection.

26. In combination with the main driving means of a steam propelled locomotive and its throttle valve and reverse lever, a booster motor normally disengaged from the locomotive and adapted to be connected therewith by movement of said reverse lever and means actuated when said throttle valve is open to prevent manipulation of the reverse lever to effect the engagement of the booster with the locomotive.

27. In combination with the main driving means of a steam propelled locomotive and its throttle valve, a booster motor normally disconnected from the locomotive and means effective when the throttle valve is open, for preventing the connection of the booster with the locomotive.

28. In combination with the main driving means of a locomotive and the device for controlling the supply of motive power thereto, a booster motor normally disconnected from the locomotive and means effective when the locomotive is supplied with motive power for preventing the connection of the booster motor with the locomotive.

29. In combination with the main driving means of a steam propelled locomotive and its throttle valve and reverse lever, a booster motor normally disengaged from the locomotive and adapted to be connected therewith by movement of said reverse lever, a member adapted to be set to prevent movement of the reverse lever to a position to effect the connection of the booster with the locomotive and means effective when said throttle valve is open for setting said member in its operative position.

30. In combination with the main driving means of a locomotive and its controlling devices, a booster motor and controlling means for the booster motor automatically operated through the manipulation of the controlling devices of the main driving means to put the booster into and out of action, comprising a device actuated when the locomotive is drifting for putting the booster motor out of action on the attainment by the locomotive of a given speed and for preventing the same from being put into action while the locomotive drifts at said speed or at a greater speed.

31. In combination with the main driving means of a locomotive, a booster motor, means effective to prevent the booster motor from being put into action while the locomotive is drifting at speeds above a given speed, and means effective when the main driving means is being supplied with motive power for preventing the booster from being put into action.

32. In combination with the main driving means of a locomotive, a booster motor normally disengaged from the locomotive, means effective to prevent the booster motor from being connected with the locomotive when the locomotive is drifting at speeds above a certain speed and means effective when the main driving means is being supplied with motive power for preventing the booster motor from being connected with the locomotive.

33. In combination with the main driving means of a steam propelled locomotive and its throttle valve and reverse lever, a booster motor adapted to be connected with and disconnected from the locomotive by operation of said reverse lever, and means effective either when the locomotive is drifting at speeds above a certain speed or when steam is being admitted to the main driving means for preventing the connection of the booster with the locomotive.

34. In combination with the main driving means of a locomotive, a booster motor, and means effective to prevent the booster motor from being put into action either while the locomotive is drifting at speeds above a certain speed or while it is being supplied with motive power.

35. In combination with the main driving means of a locomotive, a booster motor, a controlling member movable to a position to operatively connect the booster with the locomotive and means effective when the main driving means is being supplied with motive power for preventing the movement of the controlling member to said position.

36. In combination with the main driving means of a locomotive, a booster motor, a controlling member movable to a position to operatively connect the booster with the locomotive, means effective when the main driving means is being supplied with motive power for preventing the movement of the controlling member to said position, and means whereby the movement of said member to said position is ineffective to connect the booster motor with the locomotive when the locomotive drifts at speeds above a certain speed.

37. In combination with the main driving means of a locomotive, a booster motor, a controlling member movable to a position to operatively connect the booster with the locomotive, means effective when the main driving means is being supplied with motive power for preventing the movement of the controlling member to said position, and means whereby the movement of said member to said position is ineffective to connect the booster motor with the locomotive when the said last named means operating also to prevent connection of the booster motor with the locomotive when the locomotive drifting, as aforesaid, is supplied with motive power.

38. In combination with the main driving means of a locomotive, a booster motor, a fluid pressure actuated device for entraining the booster motor with the locomotive, a valve to control the flow of pressure fluid to the entraining device, a member to operate said valve, and means actuated when the main driving means is being supplied with motive power to prevent operation of said valve by said member.

39. In combination with the main driving means of a locomotive, a booster motor, a fluid pressure actuated device for entraining the booster motor with the locomotive, and means for shutting off pressure fluid from the entraining device when the locomotive is drifting at speeds above a certain speed.

40. In combination with the main driving means of a locomotive, a booster motor, a fluid pressure actuated device for entraining the booster motor with the locomotive, a valve to control flow of pressure fluid to the entraining device, a member to operate said valve, means actuated when the main driving means is being supplied with motive power to prevent the operation of said valve by said member, and means for shutting off pressure fluid from the entraining device when the locomotive is drifting at speeds above a certain speed.

41. In combination with the main driving means of a locomotive, a booster motor, a fluid pressure actuated device for entraining the booster motor with the locomotive, a valve to control flow of pressure fluid to the entraining device, a member to operate said valve, means actuated when the main driving means is being supplied with motive power to prevent the operation of said valve by said member, and means for shutting off pressure fluid from the entraining device when the locomotive is drifting at speeds above a certain speed, which last named means is effective to shut off said pressure fluid after the main driving means, with the locomotive so drifting, has been supplied with motive power.

42. In combination with the main driving means of a locomotive, a booster motor, a fluid pressure actuated device for entraining the booster motor with the locomotive, and means for shutting off pressure fluid from the entraining device when the locomotive is drifting at speeds above a certain speed, which means is effective to shut off said pressure fluid after the main driving means, with the locomotive so drifting, has been supplied with motive power.

43. In combination with the main driving means of a steam propelled locomotive, a booster motor, a fluid pressure actuated device for entraining the booster motor with the locomotive, a valve to control flow of pressure of fluid to the entraining device, a member to operate said valve and means actuated by vacuum produced by the locomotive when drifting at speeds above a certain speed for shutting off pressure fluid from the entraining device.

44. In combination with the main driving means of a steam propelled locomotive, a booster motor, a fluid pressure actuated device for entraining the booster motor with the locomotive, a valve to control flow of pressure of fluid to the entraining device, a member to operate said valve and means actuated by vacuum produced by the locomotive when drifting at speeds above a certain speed, for shutting off pressure fluid from the entraining device, which means is effective to shut off said pressure fluid after the main driving means, with the locomotive so drifting, has been supplied with steam.

45. In combination with the main driving means of a steam propelled locomotive, a booster motor, a fluid pressure actuated device for entraining the booster motor with the locomotive, a valve to control flow of pressure of fluid to the entraining device, a member to operate said valve, means actuated by vacuum produced by the locomotive when drifting at speeds above a certain speed, for shutting off pressure fluid from the entraining device, which means is effective to shut off said pressure fluid after the main driving means, with the locomotive so drifting, has been supplied with steam and means actuated when steam is supplied to the main driving means for preventing the operation of said valve by said member.

46. In combination with the main driving means of a steam propelled locomotive, a booster motor having a releasable driving connection with the locomotive and means operative when the locomotive, in drifting, attains a given speed for preventing the establishment of said driving connection.

47. In combination with the main driving means of a steam propelled locomotive, a booster motor and means whereby the booster cannot be operatively connected with the locomotive while the main driving means thereof is receiving steam.

48. In combination with the main driving means of a locomotive, a booster motor and means whereby the booster motor cannot be operatively connected with the locomotive while the main driving means is in operation.

49. In combination with the main driving means of a locomotive, a booster motor and means whereby the booster motor cannot be operatively connected with the locomotive while the locomotive is drifting faster than a predetermined speed.

50. In combination with the main driving means of a locomotive, a booster motor and means whereby the booster motor cannot be operatively connected with the locomotive while the main driving means is in operation or the locomotive is drifting faster than a predetermined speed.

In testimony whereof I hereunto affix my signature in the presence of two witnesses, this 16th day of October, 1919.

HOWARD L. INGERSOLL.

Witnesses:
J. M. WOOLDRIDGE,
T. J. DYNAN.